(12) United States Patent
Ruvini et al.

(10) Patent No.: US 8,315,917 B2
(45) Date of Patent: Nov. 20, 2012

(54) CATALOG GENERATION BASED ON DIVERGENT LISTINGS

(75) Inventors: Jean-David Ruvini, Los Gatos, CA (US); Neelakantan Sundaresan, Mountain View, CA (US); Badrul M. Sarwar, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 13/285,893

(22) Filed: Oct. 31, 2011

(65) Prior Publication Data

US 2012/0041831 A1    Feb. 16, 2012

Related U.S. Application Data

(63) Continuation of application No. 12/568,594, filed on Sep. 28, 2009, now Pat. No. 8,050,979.

(51) Int. Cl.
*G06Q 30/00* (2006.01)

(52) U.S. Cl. .................................... 705/26.1
(58) Field of Classification Search ............... 705/26.1, 705/27
See application file for complete search history.

(56) References Cited

U.S. PATENT DOCUMENTS

| 8,050,979 B2 | 11/2011 | Ruvini et al. | |
|---|---|---|---|
| 2004/0111438 A1 | 6/2004 | Chitrapura et al. | |
| 2006/0167757 A1 | 7/2006 | Holden et al. | |
| 2008/0208713 A1* | 8/2008 | Vadlamani | 705/27 |
| 2011/0078047 A1 | 3/2011 | Ruvini et al. | |

OTHER PUBLICATIONS

Ndustrial Distribution. New York: May 1978. vol. 68, Iss. 5; p. 72 http://proquest.umi.com/pqdweb?did=1131987&sid=2&Fmt=2&clientId=19649&RQT=309&VName=PQD.*

"'Total User Convenience' Build into Suppliers Catalog", Industrial Distribution 68 (5) (Abstract), [Online]. Retrieved from the Internet: <http://proquest.umi.com/pqdweb?did=1131987&sid=2&Fmt=2&clientid=19649&RQT-309&VName=PQD>, (May 1978), 72.
"U.S. Appl. No. 12/568,594 Final Office Action mailed Jul. 1, 2010", With Restriction Requirement, 14 pgs.
"U.S. Appl. No. 12/568,594 Final Office Action mailed Oct. 20, 2010", 9 pgs.
"U.S. Appl. No. 12/568,594, Advisory Action mailed Jan. 24, 2011", 3 pgs.
"U.S. Appl. No. 12/568,594, Non Final Office Action mailed Mar. 17, 2011", 10 pgs.
"U.S. Appl. No. 12/568,594, Notice of Allowance mailed Jul. 12, 2011", 8 pgs.
"U.S. Appl. No. 12/568,594, Response Filed Jun. 17, 2011 to Non-Final Office Action Received Mar. 17, 2011", 10 pgs.
"U.S. Appl. No. 12/568,594, Response filed Oct. 1, 2010 to Non Final Office Action mailed Jul. 1, 2010", 10 pgs.
"U.S. Appl. No. 12/568,594, Response filed Dec. 20, 2010 to Final Office Action mailed Oct. 20, 2010", 12 pgs.

* cited by examiner

*Primary Examiner* — Mila Airapetian
(74) *Attorney, Agent, or Firm* — Schwegman Lundberg & Woessner, P.A.

(57) ABSTRACT

A method and a system are described for catalog generation based on divergent listings. For example, a listing module may receive a divergent listing and collect data corresponding to an item in the listing. Each divergent listing of an item for sale is divergent with respect to other listings of the same item for sale. A calculation module may calculate an entropy value based on the collected data, the entropy value indicating a degree of difference between the item in the listing and a product in a catalog. A catalog module may associate the listing to the product in the catalog based on the entropy value.

20 Claims, 6 Drawing Sheets

FIG. 7

CATALOG GENERATION BASED ON DIVERGENT LISTINGS

CLAIM OF PRIORITY

This application is a continuation of U.S. application Ser. No. 12/568,594 filed Sep. 28, 2009 now U.S. Pat. No. 8,050,979, which application is incorporated in its entirety herein by reference.

TECHNICAL FIELD

The present application relates generally to the technical field of database generation and, in one specific example, to determining the suitability of varying data items to include in the generated database.

BACKGROUND

An online publishing system may receive listings from multiple users where each listing describes an item to be sold. The items may range from standard, mass-produced goods to one-of-a-kind or unique items. When many listings have been received, it may be difficult for a potential buyer or other sellers to navigate through and search for relevant listings. While some organization may be provided within the online publishing system, it may be haphazard and/or incomplete. Further, the organization within the online publishing system may not be flexible enough to incorporate new products.

BRIEF DESCRIPTION OF THE DRAWINGS

Some embodiments are illustrated by way of example and not limitation in the figures of the accompanying drawings in which.

DETAILED DESCRIPTION

Example methods and systems to determine the suitability of divergent listings in catalog generation are described. In the following description, for purposes of explanation, numerous specific details are set forth in order to provide a thorough understanding of example embodiments. It will be evident, however, to one skilled in the art that the present invention may be practiced without these specific details.

In an online publishing system, listings received from users may be for one or more items and include an item record having a description of the item. Each listing may correspond to one of a variety of products in a catalog. The products in the catalog may be stored and/or accessed as product records. While more than one listing or item record may correspond to the same product, each of the corresponding listings may describe the same product in a different way. The differing listings for the same product may be referred to as "divergent listings." Further, for some products, such as collectibles, it may be difficult or impractical to associate the item for sale with a product record in a catalog. However, for other standard products, such as mass marketed items, having more than one listing for the same product may be confusing, misleading, and/or frustrating to a potential buyer.

As such, for mass marketed products, standard products, and for some specialized products, it may be desirable to generate a catalog of products or product records so that the potential buyer may more easily find the product and compare the listings having items corresponding to the desired product. However, it may not be practical to generate a catalog that includes all listings, when the listings include both unique items and standard items. To provide a suitable catalog, it is desirable to automatically determine whether a portion of the listings comprise items that can be cataloged as products.

The term "divergent" is used herein in conjunction with the listings to indicate that the respective listings are differing or inconsistent even though the items in the listings are similar or associated with the same product. In various instances, the divergent listings may describe the same product in different ways using different words, formats, images, or the like. The divergence may be caused by, for example, different users generating their postings differently. The term "item" is used to refer to the specific object identified in a listing while the term "product" is used to refer more generically to multiple items across the listings that are determined to be identical based on, for example, an ISBN number model number, bar code, and/or some other attribute.

An "item record" and a "product record" more specifically refer to the description (e.g., text, images, etc.) of the item and the product, respectively. To simplify the description of some of the described embodiments, the terms "item" and "product" are used interchangeably with the term "item record" and the term "product record."

Platform Architecture

Figure 1:
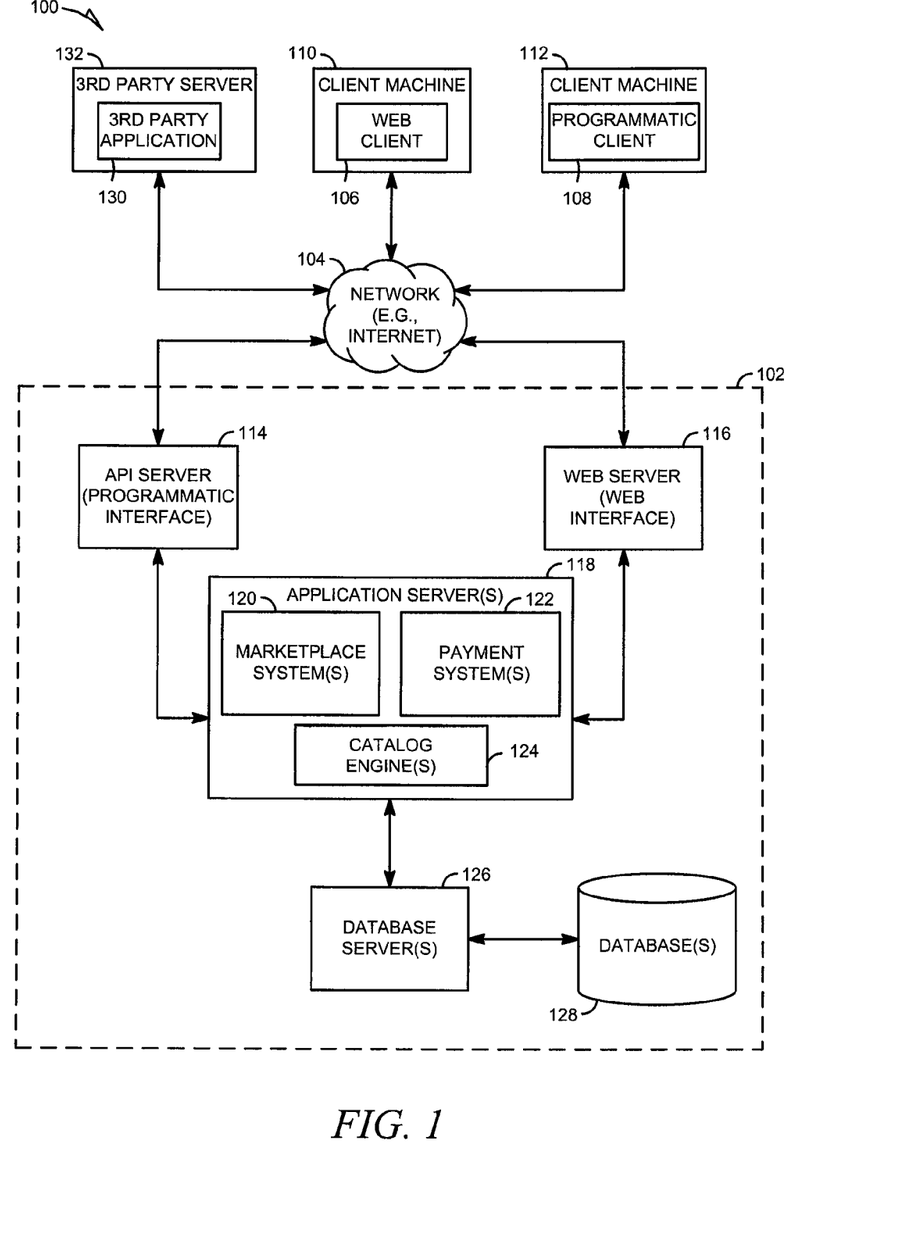
FIG. 1 is a network diagram depicting a client-server system, within which one example embodiment may be deployed.

FIG. 1 is a network diagram depicting a client-server system 100, within which one example embodiment may be deployed. A networked system 102, in the example form of a network-based marketplace, retail, or publication system, provides server-side functionality, via a network 104 (e.g., the Internet or Wide Area Network (WAN)) to one or more clients. As used herein, the terms "market" and "marketplace" should be understood to include, merely for example, a multi-buyer/multi-seller system, a single seller/multi-buyer system, and a publication system, such as a classifieds publication system. FIG. 1 illustrates, for example, a web client 106 (e.g., a browser, such as the INTERNET EXPLORER browser developed by MICROSOFT CORPORATION of Redmond, Washington State) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more marketplace systems 120, payment systems 122, and catalog engines 124. The application servers 118 are, in turn, shown to be coupled to one or more database servers 126 that facilitate access to one or more databases 128.

The marketplace systems 120 may provide a number of marketplace functions and services to users that access the networked system 102. The payment systems 122 may likewise provide a number of payment services and functions to users. The payment systems 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace systems 120. While the marketplace and payment systems 120 and 122 are shown in FIG. 1 to both form part of the networked system 102, it will be appreciated that, in alternative embodiments, the payment systems 122 may form part of a payment service that is separate and distinct from the networked system 102.

Further, while the system 100 shown in FIG. 1 employs a client-server architecture, embodiments are of course not limited to such an architecture, and could equally well find application in a distributed, or peer-to-peer, architecture system, for example. The various marketplace and payment systems 120 and 122 could also be implemented as standalone software programs, which do not necessarily have networking capabilities.

The web client 106 accesses the various marketplace and payment systems 120 and 122 via the web interface supported by the web server 116. Similarly, the programmatic client 108 accesses the various services and functions provided by the marketplace and payment systems 120 and 122 via the programmatic interface provided by the API server 114. The programmatic client 108 may, for example, be a seller application (e.g., the TURBOLISTER application developed by EBAY INC., of San Jose, Calif.) to enable sellers to author and manage listings on the networked system 102 in an off-line manner, and to perform batch-mode communications between the programmatic client 108 and the networked system 102.

Catalog engines 124 may be used to help a seller associate a listing to a product and/or to direct a potential buyer to one or more listings that correspond to a desired product. The catalog engines 124 may generate and maintain one or more catalogs that may each be associated with a specific product domain. Examples of product domains may include, for example, electronics, apparel, jewelry, toys, automotive, etc. The catalogs may be organized, for example, in a hierarchy, table structure, or other data structure known to those skilled in the art.

The catalog engines 124 are to receive divergent listings from multiple users and determine whether to catalog at least a portion of the divergent listings corresponding to a single product. The catalog engines 124 may determine whether an appropriate catalog and/or product already exists or to create a new catalog and/or product for one or more of the divergent listings. Where an appropriate catalog (or product within an existing catalog) already exists, one or more of the listings may be added to the product. However, the product is not already included in the catalog, the catalog engines 124 may operate to add the product (and the listing) to the catalog.

In some instances, the catalog engines 124 may determine that one or more of the listings will not be cataloged. A listing may be cataloged because there are not enough items corresponding to a product for the listing to be cataloged efficiently or accurately. For example, the item in the listing may not be cataloged or associated with a product if it is a unique item. Examples of items that may not be cataloged may include personal services, collector items, rarities (e.g., a pancake in the shape of Indiana or a grilled cheese sandwich with an image of The Virgin Mary), antiques, and/or homemade items.

FIG. 1 also illustrates a third party application 130, executing on a third party server machine 132, as having programmatic access to the networked system 102 via the programmatic interface provided by the API server 114. For example, the third party application 130 may, utilizing information retrieved from the networked system 102, support one or more features or functions on a website hosted by the third party. The third party website may, for example, provide one or more promotional, marketplace or payment functions that are supported by the relevant applications of the networked system 102.

Figure 2:
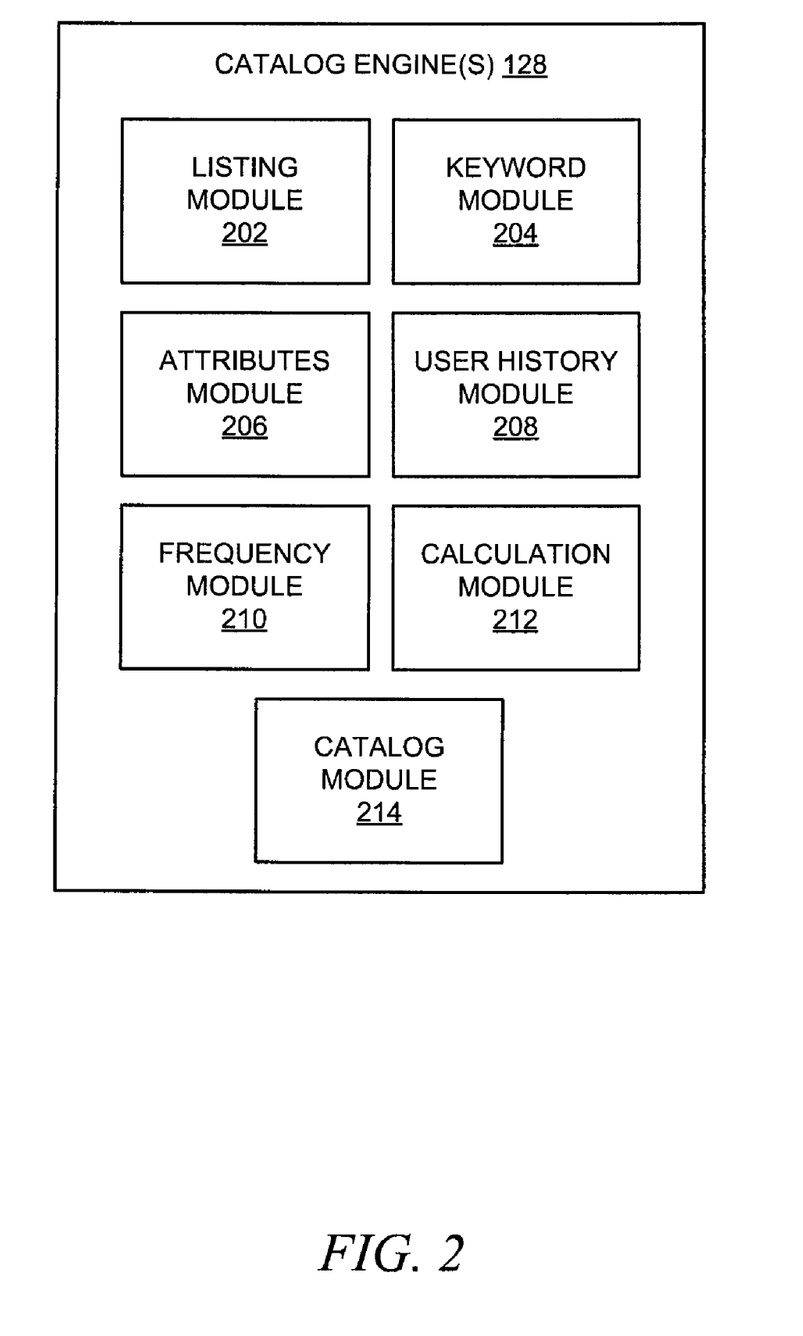
FIG. 2 is a block diagram depicting catalog engines that, in one embodiment, are provided as part of the described systems.

FIG. 2 is a block diagram for exemplary catalog engines 124 according to various embodiments. The catalog engines 124 may comprise the listing module 202, the keyword module 204, an attributes module 206, a user history module 208, a frequency module 210, a calculation module 212, and a catalog module 214.

The listing module 202 receives the divergent listings from one or more sellers and parses or scrapes portions of the listings. The listings module 202 sends the portions to one or more additional modules to collect data or metadata from each of the listings. The additional modules that provide the data or metadata from the listings may include the keyword module 204, the attributes module 206, and/or the user history module 208.

The keyword module 204 determines whether any keywords are included in a title and/or a text description of the item in the listing. The keyword module 304 receives the listing or just the text portions from the listing module 202. The keyword module 204 may seek out words or phrases such as model numbers, colors, bar codes, brand names, generic names (e.g., "digital camera"), or the like. The keyword module 204 may alternatively or additionally detect terms that indicate that an item cannot be cataloged. These terms may include, for example, "rare," "homemade," "one-of-a-kind," "miracle," "vintage," "antique," etc.

The keyword module 204 then executes one or more weighting operations to weight words in the title and/or description. For example, words in the title of the listing may be given greater weight than words in the text of the description. Frequently used words or domain-specific words may be weighted more heavily. In some instances, the weight assigned to one or more keywords may depend on the product domain.

The attributes module 206 identifies one or more attributes of the item from the listing. Attributes may include, for example, specifications such as dimensions, weight, and resolution that have a specific value to describe the product. The attributes module 206 may scrape the listing and/or receive a portion of the listing that typically corresponds to attributes, such as a table. In some instances, weighting factors are assigned to one or more attributes specific to a product domain.

One attribute that may be particularly useful in determining that a listing should be associated with a product or be cataloged as a new product is price. In some instances, consistent pricing across multiple divergent listings is an indication that the listings correspond to the same product. Further, a consistent price may indicate that the product is mass-marketed for the consistent price. The consistent price may be, for example, a manufacturer's suggested retail price (MSRP) or a common market value. In contrast, if a new listing that has similar attributes to the product but a price outside of an expected range, the new listing may not correspond to the product. For example, if the price is significantly higher, the new listing may be for an item that is a newer version of the product or be unique in some way. If the price is significantly lower, the item in the listing may be refurbished, inoperative, or otherwise different from the products in the catalog.

The user history module 208 stores and/or has access to metadata pertaining to the history of the user who submitted the listing. The metadata may include items and/or the domains of the items that the user has listed in the past. To illustrate, if a seller typically publishes listings of products within electronics, the user history module 208 provides an indication that the listing may (at least initially) likely be associated with electronics products.

The frequency module 210 determines a number of occurrences of listings of items that correspond to a single product. The frequency module 210 aids in the generation and modification of the existing catalogs. A greater number of occurrences of a product among multiple listings may result in a higher likelihood that the product may be included in a catalog. If fewer occurrences of a specific product are received in the listings, the product (and any associated listings) may be removed from the catalog. In some instances, a frequently occurring product or set of related products is split from another catalog to generate a new catalog.

The calculation module 212, based on the keywords, attributes, metadata, and other data collected by the listing module 202, performs one or more statistical calculations to determine whether each received listing can be cataloged. The statistical calculations may include, for example, a k-means function or a probability distribution. In some instances, an entropy value may be calculated to indicate the degree of difference between the listings and the products in the catalog. Alternatively or additionally, the calculation module 212 may output a confidence level expressed as a percentage to indicate the likelihood that an item in a listing matches a product and/or is the same as another item in another listing.

The catalog module 214 determines whether the listings may be catalogued based at least in part on the calculations performed by the calculation module 212. If the listings can be catalogued, the catalog module 214 may catalog the listings according to product. The catalog module 214 may operate to generate and/or modify one or more catalogs based on the products being identified in the listings and the determination of whether to catalog the products.

Flowcharts

Figure 3:
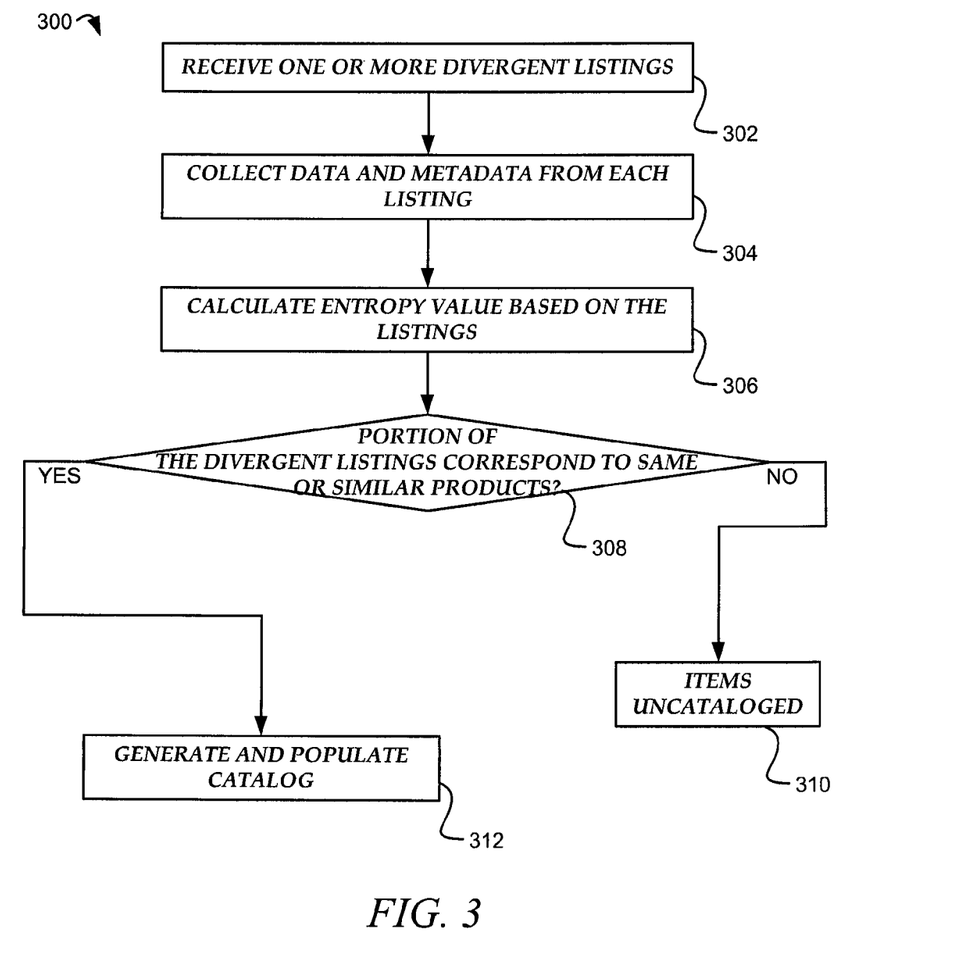
FIG. 3 is a flowchart of an exemplary process for making a determination to create a catalog according to various embodiments.

FIG. 3 is a flowchart of an exemplary process 300 for determining that a catalog will be created according to various embodiments. The process 300 may be performed by the catalog engines 124. In some instances, the process 300 may be performed when a plurality of listings is received from one or more sellers and/or if a plurality of listings is not matched with an existing product in the catalogs.

In an operation 302, divergent listings are received by the listings module 202. The divergent listings may or may not be associated with a specific domain.

In an operation 304, data and metadata may be collected from the listing using the keyword module 204, the attributes module 206, and the user history module 208. Exemplary data that may be collected include keywords, attribute values, seller characteristics, and/or the like. The data may or may not be weighted as described above.

In an operation 306, an entropy value (or other statistic) is calculated based on the listings by the calculation module 208 to indicate a degree of difference between the item in the listing and a product in a catalog. The entropy value may comprise one or more results generated by, for example, a k-means clustering function, an expectation-maximization (EM) algorithm, Principle Component Analysis (PCA), and/or a probability distribution. The entropy value may indicate whether a portion of the listings correspond to a single product and/or whether a portion of the listings do not match each other.

In an operation 308, a determination may be made by catalog module 214 that a portion of the divergent listings correspond to the same product or to similar products. If this determination is not made for at least a portion of the listings, the process 300 terminates with those listings not being cataloged in an operation 310. The determination may be made based on the entropy values of operation 306, additional calculations, and/or threshold comparisons.

Based on the determination of operation 308 having been made in the affirmative, a catalog may be generated and populated with divergent listings using the catalog module 214 in an operation 312. The catalog module 214 may include one or more products based on at least one portion of the listings, and each product may each be associated with at least one listing. Where there are multiple similar products, the catalog module 214 may separate the divergent listings between the similar products.

Figure 4:
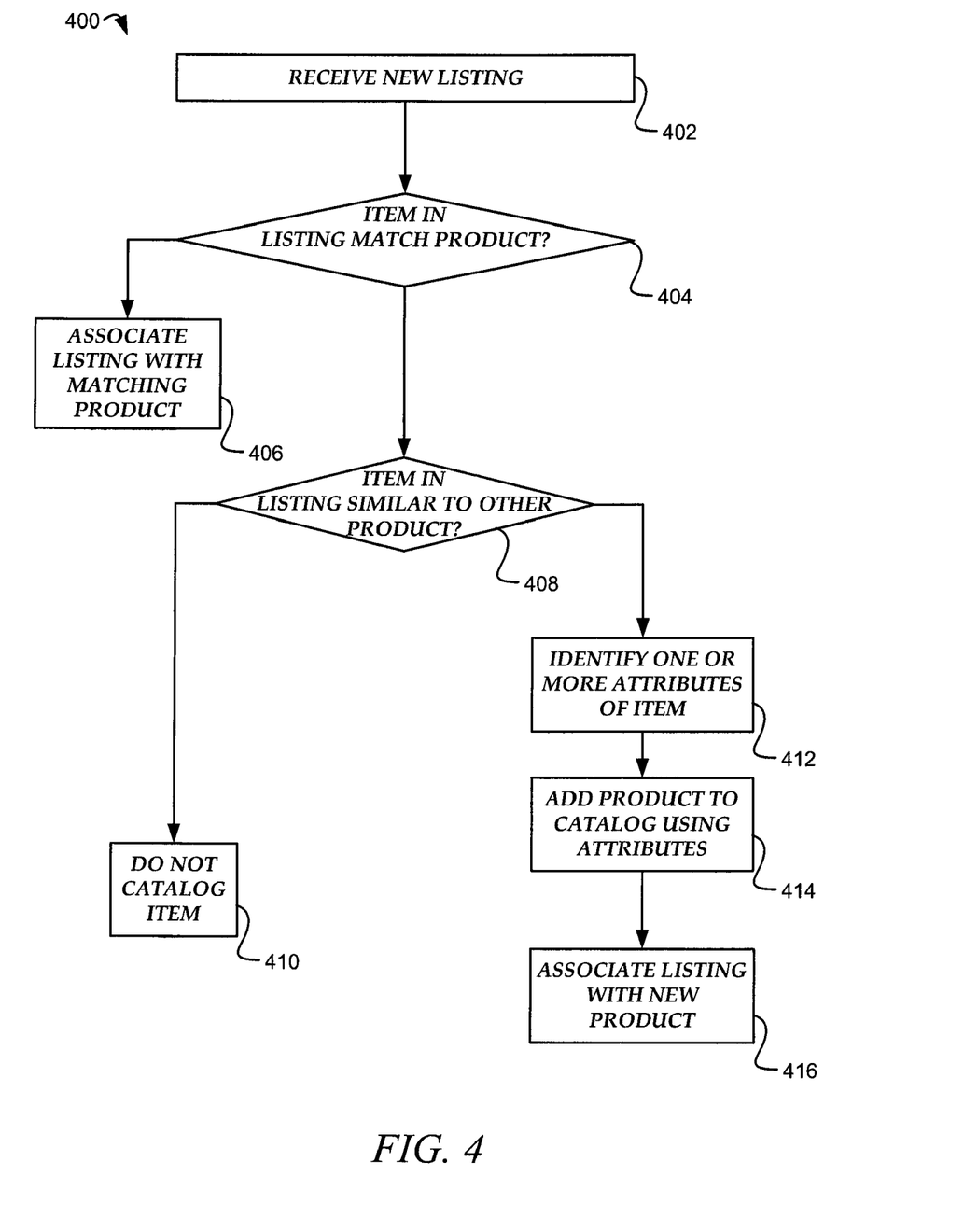
FIG. 4 is a flowchart of an exemplary process for making a determination to add a listing to a catalog.

FIG. 4 is a flowchart of an exemplary process 400 for determining that a listing will be added as a new product in a catalog. The process 400 may be performed by the catalog engines 124 when a new listing is received. The process 400 may be performed to add a listing to an existing product and/or to add a new product (and the listing from which the product was identified) to the catalog.

In an operation 402, the listing of an item is received from a seller by the listing module 202. In an operation 404, a determination that the item in the listing matches a product is made. The determination may be made based on data and metadata collected from the listing and one or more calculations as described in connection with operations 304 and 306 of FIG. 3. The determination may, for example, be based on a confidence level or similarity score. If the item matches a product, the listing is associated with the matching product in one or more catalogs in an operation 406.

In an operation 408, if the item does not match another product, a determination is made whether the item in the listing is similar to another product already in a catalog. If the item is not similar to another product, the item may not be cataloged in an operation 410. In some instances, the uncataloged item may be placed in a buffer or queue (not shown) for later catalog generation as depicted in FIG. 3. In other instances where the item may not be catalogued because it is a unique item, the uncataloged item may be designated as such.

In an operation 412, when the determination is made that the item is similar to another product, one or more attributes of the item are identified. The attributes may include keywords, model numbers, specifications, or the like. In some instances, an additional attribute for which there are no corresponding attributes in the existing product may be identified. In other instances, the identified attributes may comprise new values for one or more corresponding attributes in the existing product.

In an operation 414, a new product corresponding to the item may be created and added to the catalog based on the attributes. The listing itself may be associated with the new product in an operation 416.

Data Structures

Figure 5:
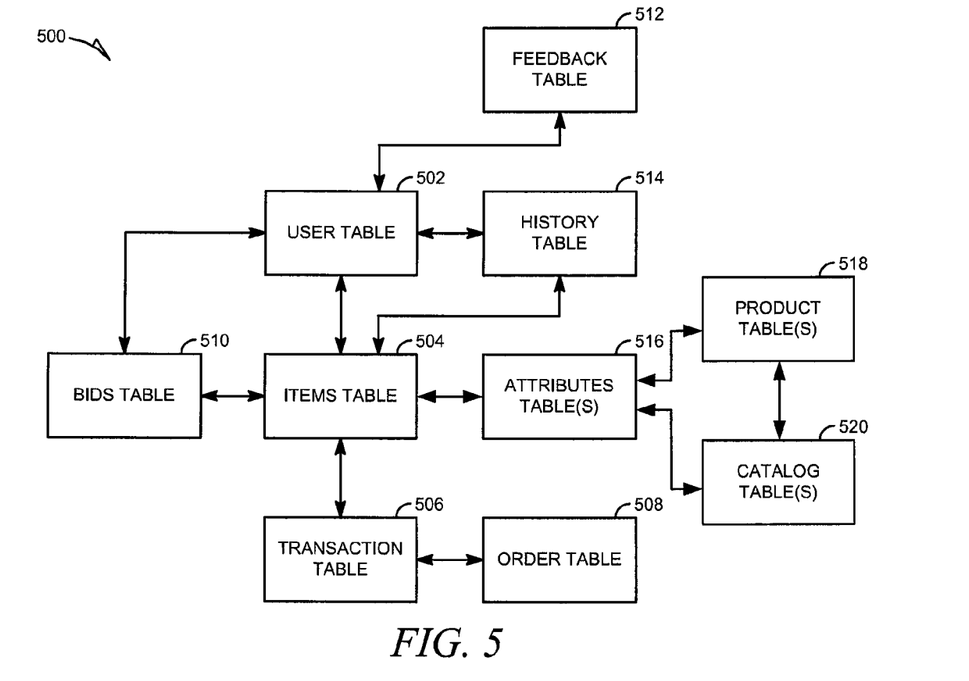
FIG. 5 is a high-level entity-relationship diagram, illustrating various tables that may be maintained.

FIG. 5 is a high-level entity-relationship diagram, illustrating various tables 500 that may be maintained within the databases 128, and that are utilized by and support the systems 120 and 122. A user table 502 contains a record for each registered user of the networked system 102, and may include identifier, address and financial instrument information pertaining to each such registered user. A user may operate as a seller, a buyer, or both, within the networked system 102. In one example embodiment, a buyer may be a user that has accumulated value (e.g., commercial or proprietary currency), and is accordingly able to exchange the accumulated value for items that are offered for sale by the networked system 102.

The tables 500 also include an items table 504 in which are maintained item records for goods and services that are available to be, or have been, transacted via the networked system 102. Each item record within the items table 504 may furthermore be linked to one or more user records within the user table 502, so as to associate a seller and one or more actual or potential buyers with each item record.

A transaction table 506 contains a record for each transaction (e.g., a purchase or sale transaction) pertaining to items for which records exist within the items table 504.

An order table 508 is populated with order records, each order record being associated with an order. Each order, in turn, may be with respect to one or more transactions for which records exist within the transaction table 506.

Bid records within a bids table 510 each relate to a bid received at the networked system 102 in connection with an auction-format listing. A feedback table 512 is utilized, in one example embodiment, to construct and maintain reputation information concerning users. A history table 514 maintains a history of transactions to which a user has been a party. One or more attributes tables 516 record attribute information pertaining to items for which records exist within the items table 504. Considering only a single example of such an attribute, the attributes tables 516 may indicate a currency attribute associated with a particular item, the currency attribute identifying the currency of a price for the relevant item as specified in by a seller.

Product tables 518 may each relate one or more products with one or more attributes of those products and one or more catalogs. The catalog tables 520 may each relate the products and/or the attributes to the catalogs.

Figure 6:
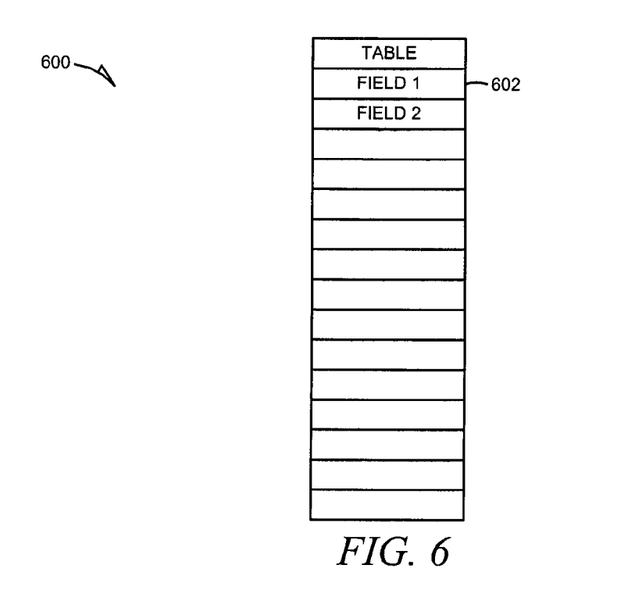
FIG. 6 provides further details regarding product tables and catalog tales that are shown in FIG. 5 to be maintained within databases.

FIG. 6 provides further details regarding product tables 518 and the catalog tables 520 to be maintained within the databases 128. The product tables 618 (e.g., table 600) may each store data about each product that has been identified in the catalog. For example, each field (e.g., field 602) may store a value corresponding to an attribute of the product. The each table (e.g., table 600) of catalog tables 620 may store product identifiers associated with a catalog in the fields (e.g., fields 602).

Figure 7:
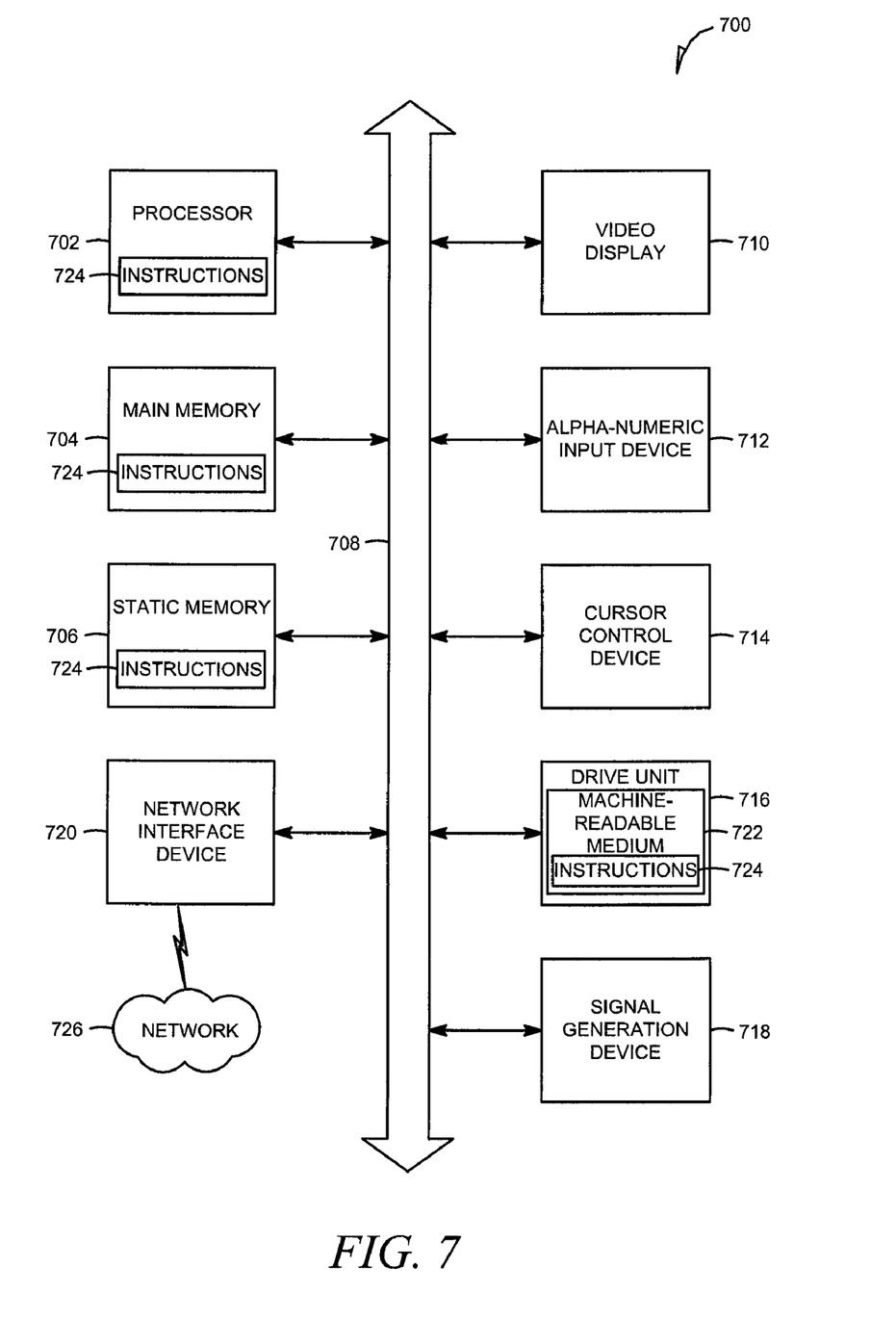
FIG. 7 shows a diagrammatic representation of a machine in the example form of a computer system within which a set of instructions, for causing the machine to perform any one or more of the methodologies discussed herein, may be executed.

FIG. 7 shows a diagrammatic representation of a machine in the example form of a computer system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU) a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media.

The software 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Certain embodiments are described herein as including logic or a number of components, modules, or mechanisms. Modules may constitute either software modules (e.g., code embodied on a machine-readable medium or in a transmission signal) or hardware modules. A hardware module may be a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, a method and system to determine suitability of divergent listings in catalog generation have been described. Although the present invention has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   receiving one or more divergent listings within a domain, the domain comprising a catalog that comprises descriptions of one or more products, the descriptions including attributes of each of the one or more products, each divergent listing including at least one attribute that is divergent with respect to the attributes of the one or more products;
   determining, using one or more processors, that a first portion of the divergent listings each include a first attribute that is divergent from the attributes of each of the one or more products;
   generating a new product description in the catalog based on the first attribute included in the first portion of the divergent listings; and
   associating the first portion of the divergent listings with the new product description based on the first attribute.

2. The method of claim 1, further comprising determining that a second portion of the divergent listings each correspond to a unique item and excluding the second portion of the divergent listings from the catalog.

3. The method of claim 1, further comprising generating another catalog within the domain based on a second attribute associated with a second portion of the divergent listings, wherein the second portion of the divergent listings includes listings having distinct values associated with the second attribute.

4. The method of claim 1, further comprising adding the first attribute to the one or more product descriptions.

5. The method of claim 4, further comprising assigning a first value to the first attribute added to the one or more product descriptions.

6. The method of claim 1, wherein each divergent listing of the first portion of the divergent listings include a second attribute included in each of the one or more products, and wherein a value associated with each of the first portion of divergent listings is distinct from values associated with the second attribute included in each of the one or more products.

7. The method of claim 1, wherein the associating of the first portion of the divergent listings with the new product description is based on a calculated entropy value.

8. A system comprising:
one or more processors;
a listing module to receive one or more divergent listings within a domain, the domain comprising a catalog that comprises descriptions of one or more products, the descriptions including attributes of each of the one or more products, each divergent listing including at least one attribute that is divergent with respect to the attributes of the one or more products;
an attribute module to determine, using one or more processors, that a first portion of the divergent listings each include a first attribute that is divergent from the attributes of each of the one or more products; and
a catalog module to generate a new product description in the catalog based on the first attribute included in the first portion of the divergent, listings and to associate the first portion of the divergent listings with the new product description based on the first attribute.

9. The system of claim 8, wherein the catalog module is further to determine that a second portion of the divergent listings each correspond to a unique item and excluding the second portion of the divergent listings from the catalog.

10. The system of claim 8, wherein the catalog module is further to generate another catalog within the domain based on a second attribute associated with a second portion of the divergent listings, wherein the second portion of the divergent listings includes listings having distinct values associated with the second attribute.

11. The system of claim 8, wherein the catalog module is further to add the first attribute to the one or more product descriptions.

12. The system of claim 11, wherein the catalog module is further to assign a first value to the first attribute added to the one or more product descriptions.

13. The system of claim 8, wherein each divergent listing of the first portion of the divergent listings include a second attribute included in each of the one or more products, and wherein a value associated with each of the first portion of divergent listings is distinct from values associated with the second attribute included in each of the one or more products.

14. The system of claim 8, wherein the catalog module is to associate the first portion of the divergent listings with the new product description based on a entropy value.

15. A machine-readable storage medium having instructions embodied thereon, the instructions executable by one or more processors to perform operations comprising:
receiving one or more divergent listings within a domain, the domain comprising a catalog that comprises descriptions of one or more products, the descriptions including attributes of each of the one or more products, each divergent listing including at least one attribute that is divergent with respect to the attributes of the one or more products;
determining, using one or more processors, that a first portion of the divergent listings each include a first attribute that is divergent from the attributes of each of the one or more products;
generating a new product description in the catalog based on the first attribute included in the first portion of the divergent listings; and
associating the first portion of the divergent listings with the new product description based on the first attribute.

16. The non-transitory machine-readable medium of claim 15, wherein the operations further comprise determining that a second portion of the divergent listings each correspond to a unique item and excluding the second portion of the divergent listings from the catalog.

17. The non-transitory machine-readable medium of claim 15, wherein the operations further comprise generating another catalog within the domain based on a second attribute associated with a second portion of the divergent listings, wherein the second portion of the divergent listings includes listings having distinct values associated with the second attribute.

18. The non-transitory machine-readable medium of claim 15, wherein the operations further comprise adding the first attribute to the one or more product descriptions.

19. The non-transitory machine-readable medium of claim 15, wherein each divergent listing of the first portion of the divergent listings include a second attribute included in each of the one or more products, and wherein a value associated with each of the first portion of divergent listings is distinct from values associated with the second attribute included in each of the one or more products.

20. The non-transitory machine-readable medium of claim 15, wherein the associating of the first portion of the divergent listings with the new product description is based on a calculated entropy value.

* * * * *

UNITED STATES PATENT AND TRADEMARK OFFICE
CERTIFICATE OF CORRECTION

PATENT NO. : 8,315,917 B2
APPLICATION NO. : 13/285893
DATED : November 20, 2012
INVENTOR(S) : Ruvini et al.

It is certified that error appears in the above-identified patent and that said Letters Patent is hereby corrected as shown below:

Title page, in column 1, under "Other Publications", line 1, delete "Ndustrial Distribution." and insert --"A giant step ... 'Total user convenience' built into supplier's catalog", Industrial Distribution,--, therefor Title page, in column 1, under "Other Publications", line 1, after "72", insert --,--, therefor Title page, in column 2, under "Other Publications", line 4, delete "72." and insert --72 pgs.--, therefor Title page, in column 2, under "Other Publications", line 5, after "12/568,594", insert --,--, therefor Title page, in column 2, under "Other Publications", line 7, after "12/568,594", insert --,--, therefor Title page, in column 2, under "Other Publications", line 15, delete "Filed" and insert --filed--, therefor Title page, in column 2, under "Other Publications", line 16, delete "Received" and insert --mailed--, therefor In the drawings, Sheet 2 of 6, Fig. 2, reference numeral 128, delete "128" and insert --124--, therefor In the Specification In column 4, line 31, delete "304" and insert --204--, therefor In column 6, line 21, after "may", delete "each", therefor In column 7, line 45, delete "618" and insert --518--, therefor In column 7, line 49, delete "620" and insert --520--, therefor Signed and Sealed this
Thirtieth Day of April, 2013

Teresa Stanek Rea
*Acting Director of the United States Patent and Trademark Office*

CERTIFICATE OF CORRECTION (continued)
U.S. Pat. No. 8,315,917 B2

In column 8, line 7, after "(CPU)", insert --,--, therefor

In the Claims

In column 11, line 19, in claim 8, after "divergent", delete ",", therefor